United States Patent
Field et al.

[15] 3,697,545
[45] Oct. 10, 1972

[54] IRRADIATED PRODUCTS OF 3H-1,4-BENZODIAZEPINE 4-OXIDES

[72] Inventors: George Francis Field, West Caldwell; Leon Henryk Sternbach, Upper Montclair, both of N.J.

[73] Assignee: Hoffmann-La Roche Inc., Nutley, N.J.

[22] Filed: Sept. 19, 1969

[21] Appl. No.: 861,545

Related U.S. Application Data

[62] Division of Ser. No. 665,293, Sept. 5, 1967, Pat. No. 3,555,022.

[52] U.S. Cl..........260/333, 260/250 R, 260/326.5 D, 260/293.58, 260/296 B, 424/278, 204/158 R
[51] Int. Cl. .............................................C07d 87/54
[58] Field of Search......................................260/383

[56] References Cited

OTHER PUBLICATIONS

L. H. Sternbach et al., Jour. Org. Chem., Vol. 27, Dec. 1962, pp. 4,671–2.

*Primary Examiner*—Norma S. Milestone
*Attorney*—Samuel L. Welt, Jon S. Saxe, Bernard S. Leon, William H. Epstein and George M. Gould

[57] ABSTRACT

1,3,6-Benzoxadiazocines and 1,2-dihydro-quinoxalines are useful as anti-inflammatory agents, anti-convulsants and anti-bacterial agents and methods for their production.

1 Claim, No Drawings

IRRADIATED PRODUCTS OF 3H-1,4-BENZODIAZEPINE 4-OXIDES

CROSS REFERENCE TO RELATED APPLICATION

This application is a divisional application of Ser. No. 665,293, filed Sept. 5, 1967, Field and Sternbach now U.S. Pat. No. 3,555,022, issued Jan. 12, 1971.

SUMMARY OF THE INVENTION

In accordance with this invention, we have discovered that compounds selected from the group consisting of compounds of the formula:

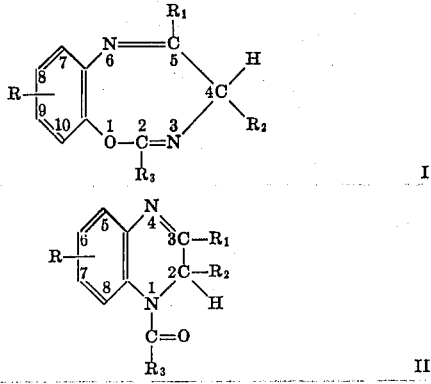

and pharmaceutically acceptable salts,
wherein R is selected from the group consisting of hydrogen, lower alkyl halogen, nitro, and trifluoromethyl; $R_1$ is selected from the group — $NR_4R_5$, hydrogen, and lower alkyl; $R_2$ is selected from the group consisting of hydrogen, lower alkyl and lower alkoxy-lower alkyl; $R_3$ is selected from the group consisting of phenyl, lower alkyl substituted phenyl, nitro substituted phenyl, halo substituted phenyl and pyridyl; and $R_4$ and $R_4$ and $R_5$ are selected from the group consisting of hydrogen and lower alkyl and $R_4$ and $R_5$ taken together with their attached nitrogen atom form a 5 or 6 membered heterocyclic ring.
are active as anti-inflammatory agents, anti-convulsants and anti-bacterial agents, such as disinfecting agents against such micro-organisms as *D. pneumoniae* and *E. insidiosa*.

Compounds of Formulae I and II above, are prepared in accordance with this invention by subjecting 3H-1,4-benzodiazepine 4-oxide compound of the formula:

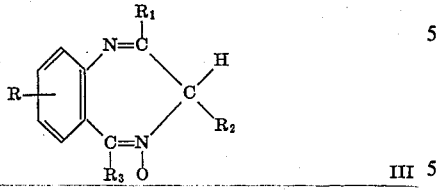

wherein R, $R_1$, $R_2$ and $R_3$ are as above. to ultra-violet light.

Also included within the purview of the present invention are the acid addition salts of the novel medicinally valuable 1,3,6-benzoxadiazocines and 1,2-dihydro-quinoxalines of Formulae I and II above. More particularly, the compounds of Formulae I and II above, form acid addition salts with pharmaceutically acceptable organic and inorganic acids, such as hydrochloric acid, hydrobromic acid, nitric acid, sulfuric acid, acetic acid, formic acid, succinic acid, maleic acid, p-toluene sulfonic acid and the like.

DETAILED DESCRIPTION OF THE INVENTION

The numbering of the benzoxadiazocine ring system is shown in Formula I above, for the purposes of convenience. Also the numbering of the quinoxaline ring system is shown in Formula II above, for the purposes of convenience.

As used herein, the term "lower alkyl" includes both straight and branched chain alkyl groups having from one to seven carbon atoms, such as methyl, ethyl, propyl, isopropyl, and the like. In like manner the term "lower alkoxy" refers to both straight and branched chain alkoxy radicals, containing one to seven carbon atoms such as methoxy, ethoxy, butoxy, etc. The term "halogen" includes bromine, chlorine, fluorine, and iodine.

In the preferred embodiment of 1,3,6-benzoxadiazocines of Formula I above, R is a substituent in the 9-position and is either halogen, trifluoromethyl, or nitro. In the preferred embodiment of the 1,2-dihydroquinoxalines of Formula II above, R is a substituent in the 7-position and is a halogen. When R is a halogen, the preferred halogen is chlorine. In the 1,3,6-benzoxadiazocines of formula I above, $R_2$ is preferably hydrogen or a lower alkyl radical such as methyl or ethyl. When $R_2$ is a lower alkoxy-lower alkyl, the $R_2$ is preferably methoxy-methyl, methoxy-ethyl or ethoxy-methyl.

In accordance with the preferred embodiment of this invention, $R_1$ is an amino radical of the formula:

wherein $R_4$ and $R_5$ are as above.

Among the preferred amino radicals are, methylamino, ethylamino, diethylamino, dimethylamino, pyrrolidino and piperidino.

In the preferred embodiment of compounds of Formulae I and II above, $R_3$ is either phenyl, 2-pyridyl, or phenyl substituted on the 2-position with a halo group such as chlorine or fluorine.

The 1,3,6-benzoxadiazocines of Formula I, and the 1,2-dihydro-quinoxalines of Formula II are useful as anti-inflammatory agents and anti-convulsants. The compounds of Formulae I and II, as well as their pharmaceutically acceptable acid addition salts, are used in the form of conventional pharmaceutical preparations, which contain said compounds in connection with conventional pharmaceutical organic or inorganic materials suitable for internal administration. The pharmaceutical compositions containing the compounds of Formulae I and II above, as well as their pharmaceutically acceptable acid addition salts, can be administered parenterally or orally. Dosages can be adjusted to individual requirements, for example, these compounds can be administered in dosages of from 0.01 mg/kg to about 10.0 mg/kg per day. These dosages can be administered in a single dosage form or in divided dosage forms. The pharmaceutical compositions can contain conventional organic or inorganic inert carrier materials, such as water, gelatin, lactose, starch, magnesium stearate, talc, vegetable oils, gums, polyalkylene glycols, vaseline, or the like. The pharmaceutical preparations can be in conventional solid dosage forms, such as tablets, dragees, suppositories, capsules or in conventional liquid dosage forms, such as solutions, suspensions or emulsions. The pharmaceutical compositions can be submitted to conventional pharmaceutical expedients, such as sterilization and/or can contain pharmaceutical additives, such as preservatives, stabilizing agents, wetting agents, emulsifying agents, salts for adjusting the osmotic pressures, buffers or the like. It also can contain other therapeutically useful materials.

The anti-convulsant activity of the compounds of Formulae I and II above, can be seen from the maximal electroshock test in mice which is described in Behrens, Arch. Expt. Path. and Pharm. 140: 237, 1929. A compound such as 9-chloro-5-methylamino-2-phenyl-4H-1,3,6-benzoxadiazocine has an $ED_{50}$ of 692 mg/kg p.o. as measured by the maximal electroshock test.

The use of the compounds of Formula I and II as anti-inflammatory agents can be seen from the yeast inflammed foot test which is described in Randall et al., Arch. Int. Pharmacodyn. 111: 409, 1957. A compound such as 1-benzoyl-7-chloro-1,2-dihydro-3-methylaminoquinoxaline has an $ED_{50}$ of 100 mg/kg p.o. as measured by the yeast inflammation foot test, whereas acetyl salicylic acid, a common anti-inflammatory agent, has an $ED_{50}$ of 400 mg/kg p.o. as measured by this same test.

The 1,3,6-benzoxadiazocines of formula I above, and the 1,2-dihydro-quinoxalines of Formula II above, are useful in various cleansing protective coatings and other product formulations to provide inhibition of microbial growths. These compounds of Formulae I and II above, can be applied to surfaces to destroy microbial growth by means of organic solvents such as ethanol. Furthermore, the compounds of Formulae I and II above, can be utilized in the formulation of commercial detergents such as laundry or dish-washing detergents. The compounds of Formulae I and II above, can be utilized with any conventional anionic or nonionic detergents.

The compounds of Formulae I and II above are effective anti-bacterial agents against a variety of micro organisms. For example, the minimum inhibitory concentrations (MIC) in mcg/ml determine in vitro by the serial broth dilution method utilizing a trypticase soy broth for 9-chloro-5-methylamino-2-phenyl-4H-1,3,6-benzoxadiazocine was 39 for D. pneumoniae and 2,500 for E. insidiosa. The minimum inhibitory concentration in mcg/ml for 1-benzoyl-7-chloro-1,2-dihydro-3-methylamino-quinoxaline measured by the same test was 156 for S. pyogenes, 15.6 for D. pneumoniae, 31.25 for E. insidiosa, and 312.5 for S. agalictiae.

The compounds of Formulae I and II above, can be prepared from compounds of the Formula III above, by means of subjecting the compounds of the Formula III above, to irradiation with ultraviolet light. In carrying out this reaction, any conventional ultraviolet light source can be utilized. This reaction is carried out in the presence of an inert organic solvent. Any conventional inert organic solvent can be utilized. Typical solvents which can be utilized in accordance with this invention include, benzene, ethanol, toluene, tetrahydrofuran, hexane, pentane, diethyl ether. In this reaction, temperatures of from $-10°$ to $150°$ C. can be utilized. Generally, it is preferred to carry out this reaction at the reflux temperature of the solvent. The irradiation of the compound of Formula III above, to produce compounds of the Formulae I and II above, is generally carried out by exposure to ultraviolet light for a period of from 1 hour to 3 days. The use of longer times produces a better conversion of the compounds of Formula III above, to compounds of Formulae I and II above. Longer time periods than 3 days can be utilized if desired. Generally, irradiation times of greater than 3 days are seldom utilized since no additional beneficial results are achieved by utilizing such long exposure times.

The irradiation of compounds of the Formula III above, produces compounds of the Formulae I and II above, in the form of a mixture. The compounds of the Formula I above, an be easily separated from the compounds of the Formula II above, by conventional separating methods due to the solubility differences of these compounds in various inert organic solvents and to the in the adsorption rates of these compounds on various adsorbents. Therefore, the compounds of Formula I above, can be separated from the compounds of Formula II above, by any conventional solvent separating means, such as fractional crystallization, etc. utilizing conventional inert organic solvents.

Furthermore, due to the differences in the adsorption rates of the compounds of Formulae I and II above, on conventional adsorbents, compounds of Formula I above can be separated from compounds of Formula II above by the use of any conventional adsorbing procedures, such as chromatography. This proceudre can utilize any conventional adsorbing means, such as silica, alumina, florosil, etc.

In accordance with a preferred embodiment of this invention, $R_1$ in compounds of the Formula II above, is

wherein $R_4$ and $R_5$ are as above.
so that compounds of the Formula II above, have the formula

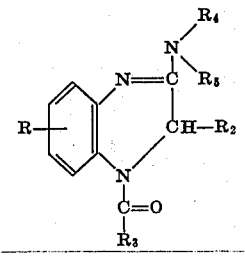

IV wherein R, $R_2$, $R_3$, $R_4$ and $R_5$ are as above.

The compounds of the Formula IV can be prepared from compounds of the formula:

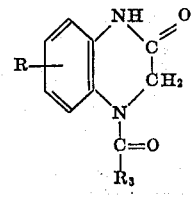

V wherein R, and $R_3$ are as above.
by means of reacting the compounds of the Formula V above, with an organic amino compound of the formula:

wherein $R_4$ and $R_5$ are as above.
in the presence of an acid catalyst.

In carrying out the above reaction, any conventional organic amino compound can be utilized. Among the preferred amino compounds which can be utilized in carrying out this reaction are included, methylamine, ethylamine, isopropylamine, propylamine and butylamine. While it is preferred to utilize amino compounds in carrying out this reaction, secondary amino compounds can be utilized. Any conventional lower alkyl secondary amino compounds can be utilized in this reaction. Among the preferred secondary amino compounds which can be utilized in this reaction are included, diethylamine, dimethylamine, N,N-propylbutylamine, pyrrolidine, and piperidine.

In carrying out this reaction with the primary amino compound, any conventional acid catalyst can be utilized. Typical acid catalysts which may be utilized in carrying out this reaction include p-toluene sulfonic acid, Lewis acids, such as titanium tetrachloride, aluminum chloride, stannic tetrafluoride, ferric chloride, arsenic trichloride, boron trifluoride. The preferred acid catalysts which are utilized in accordance with this invention are p-toluene sulfonic acid and titanium tetrachloride. The conversion of the compounds of the Formula V above, into compounds of the Formula IV above, is carried out in the presence of an inert organic solvent. Any conventional inert organic solvent, such as those mentioned hereinbefore, can be utilized in carrying out this reaction. In carrying out this reaction, temperature and pressure are not critical, and this reaction can be effected at room temperature or below, and at atmospheric pressure or at elevated temperatures, and/or elevated pressure. Generally, it is preferred to carry out this reaction at a temperature of from about 0° C. to about 25° C. While it is generally preferable to utilize these low temperatures, temperatures as high as the reflux temperature of the solvent can be utilized.

The invention is further illustrated by the following examples. In the examples, all temperatures are given in degrees centigrade.

EXAMPLE 1

Photolysis of 7-Chloro-2-Methylamino-5-Phenyl-3H-1,4-Benzodiazepine 4-Oxide

A solution of 10 g. of 7-chloro-2-methylamino-5-phenyl-3H-1,4-benzodiazepine 4-oxide in a mixture of 0.4 l. of ethanol and 1 l. of benzene was irradiated for 18 hours with an unfiltered Hanovia 200 watt lamp. The solution was concentrated in vacuo, and the residue crystallized from ether to give a mixture of two photo isomers 9-chloro-5-methylamino-2-phenyl-4H-1,3,6benzoxadiazocine and 1-benzoyl-7-chloro-1,2-dihydro-3-methylaminoquinoxaline. Recrystallization of a portion of this mixture 3 times from ethanol gave 9-chloro-5-methyl-amino-2-phenyl-4H-1,3,6-benzoxadiazocine as beige needles.

To a solution of 5 g. of the above mixture of 9-chloro-5-methylamino-2-phenyl-4H-1,3,6-benzoxadiazocine and 1-benzoyl-7-chloro-1,2-dihydro-3-methylaminoquinoxaline, in 125 ml. of hot ethanol was added 25 ml. of 1 N hydrochloric acid, and mixture was heated on the steam bath for 5 minutes. Dilution to 375 ml. with water and cooling gave 2-benzamido-4'-chloro-2'-hydroxyacetanilide.

The aqueous mother liquors left after separation of 2-benzamido-4'-chloro-2'-hydroxyacetanilide were neutralized with concentrated ammonium hydroxide to give 1-benzoyl-7-chloro-1,2-dihydro-3-methylaminoquinoxaline.

EXAMPLE 2

4-Benzoyl-6-Chloro-3,4-Dihydro-2-Methylaminoquinoxaline from 4-Benzoyl-6-Chloro-3,4-Dihydroquinoxalin-2(1H)-One To a solution of 5.4 g. (20 mmole) of 4-benzoyl-6-chloro-3,4-dihydroquinoxalin-2(1H)-one in 500 ml. of tetrahydrofuran saturated at 10° with methylamine was added 3 ml. (23 mmole) of titanium tetrachloride dissolved in 100 ml. of benzene. This mixture was stirred and heated under reflux for 2 hours. To the cooled solution there was added 30 ml. of water. The precipitate was removed by filtration, and the filtrate dried (sodium sulfate) and concentrated in vacuo to give 1-benzoyl-7-chloro-1,2-dihydro-3-methylaminoquinoxaline.

EXAMPLE 3

| | Per Capsule |
|---|---|
| 1-Benzoyl-7-chloro-1,2-dihydro-3-methylaminoquinoxaline | 10 mg. |
| Lactose, U.S.P. | 165 mg. |
| Corn Starch, U.S.P. | 30 mg. |
| Talc, U.S.P. | 5 mg. |
| Total Weight | 210 mg. |

A 210 mg. capsule was prepared by the following: 1Benzoyl-7-chloro-1,2-dihydro-3-methylaminoquinoxaline, lactose and corn starch were mixed in a suitable mixer. The mixture was further blended by passing through a Fitzpatrick Comminuting Machine with a No. 1A screen with knives forward. The blended powder was returned to the mixer, the talc added and blended thoroughly. The mixture was filled into No. 4 hard shell gelatin capsules on a Parke Davis capsulating machine. (Any similar type capsulating machine may be used.)

EXAMPLE 4

A 210 mg. capsule was prepared in the same manner as Example 3 except that 9-chloro-5-methylamino-2-phenyl-4H-1,3,5-benzoxadiazocine was the active ingredient.

EXAMPLE 5

| | Per cc. |
|---|---|
| 1-Benzoyl-7-chloro-1,2-dihydro-3-methylaminoquinoxaline | 5.0 mg. |
| Propylene Glycol | 0.4 cc. |
| Benzyl Alcohol (Benzaldehyde free) | 0.015 cc. |
| Ethanol 95 percent USP | 0.10 cc. |
| Sodium Benzoate | 48.8 mg. |
| Benzoic Acid | 1.2 mg. |
| Water for injection | 1.0 cc. |

A 1,000 cc. parenteral formulation was prepared as follows: The 50 grams of 1-benzoyl-7-chloro-1,2-dihydro-3-methylaminoquinoxaline were dissolved in 150 cc. of benzyl alcohol; 4,000 cc. of propylene glycol and 1,000 cc. of ethanol were added. The 12 grams of benzoic acid were dissolved in the above. The 488 grams of sodium benzoate dissolved in 3,000 cc. of Water for injection were added. The solution was brought up to final volume of 10,000 cc. with Water for injection. The solution was filtered through an O2 Selas candle, filled into suitable size ampuls, gassed with $N_2$ and sealed. It was then autoclaved at 10 p.s.i. for 30 minutes.

EXAMPLE 6

A 1,000 cc. parenteral formulation was prepared in the same manner as Example 5, except that 9-chloro-5-methylamino-2-phenyl-4H-1,3,5-benzoxadiazocine was the active ingredient.

EXAMPLE 7

| | Per Tablet |
|---|---|
| 1-Benzoyl-7-chloro-1,2-dihydro-3-methylaminoquinoxalin | 25.00 mg. |
| Dicalcium Phosphate Dihydrate, Unmilled | 175.00 mg. |
| Corn Starch | 24.00 mg. |
| Magnesium Stearate | 1.00 mg. |
| Total Weight | 225.00 mg. |

A 225 mg. tablet was prepared according to the following procedure:
1-Benzoyl-7-chloro-1,2-dihydro-3-methylaminoquinoxaline and corn starch were mixed together and passed through a No. 00 screen in Model "J" Fitz with hammers forward. This premix was then mixed with dicalcium phosphate and one-half of the magnesium stearate, passed through a No. 1A screen in Model "J" Fitz with knives forward and slugged. The slugs were passed through a No. 2A plate in Model "D" Fitz at slow speed with knives forward, and the remaining magnesium stearate was added. The mixture was mixed and compressed.

EXAMPLE 8

A 225 mg. tablet was prepared in the same manner as Example 7, except that 9-chloro-5-methylamino-2-phenyl-4H-1,3,5-benzoxadiazocine was the active ingredient.

We claim:
1. 9-Chloro-5-methylamino-2-phenyl-4H-1,3,6-benzoxadiazocine.

* * * * *